United States Patent [19]

Fukuoka

[11] Patent Number: 5,219,956
[45] Date of Patent: Jun. 15, 1993

[54] METHOD FOR HARDENING A ONE-PACKAGE EPOXY FORMULATION INCLUDING PARTIAL CURING

[75] Inventor: Masayuki Fukuoka, Fuji, Japan

[73] Assignee: Asahi Kasei Kogyo Kabushiki Kaisha, Osaka, Japan

[21] Appl. No.: 863,536

[22] Filed: Apr. 6, 1992

Related U.S. Application Data

[63] Continuation of Ser. No. 479,017, Feb. 12, 1990, abandoned.

[30] Foreign Application Priority Data

Feb. 13, 1989 [JP] Japan ................................ 1-31094

[51] Int. Cl.$^5$ .............................................. C08G 59/18
[52] U.S. Cl. ........................ 525/526; 528/87; 528/93; 528/94; 528/111; 528/117; 528/123; 528/407
[58] Field of Search ................. 528/87, 111, 117, 123, 528/407, 94, 93; 525/526

[56] References Cited

U.S. PATENT DOCUMENTS

| | | | |
|---|---|---|---|
| 4,530,991 | 7/1985 | Hirai et al. | 528/123 |
| 4,544,733 | 10/1985 | Hirai et al. | 528/123 |
| 4,588,617 | 5/1986 | Oka | 528/88 |
| 4,742,148 | 5/1988 | Lee et al. | 528/117 |
| 4,797,455 | 1/1989 | Lin et al. | 528/117 X |
| 4,859,761 | 8/1989 | Flury et al. | 528/123 |

FOREIGN PATENT DOCUMENTS 0304503 3/1989 European Pat. Off. .
1301272 7/1962 France .
1169639 11/1969 United Kingdom .

*Primary Examiner*—John C. Bleutge
*Assistant Examiner*—Frederick Krass
*Attorney, Agent, or Firm*—Armstrong, Westerman, Hattori, McLeland & Naughton

[57] ABSTRACT

There is disclosed a method for hardening a curable one-package epoxy resin system formed of an epoxy resin and a hardener, which comprises heating the curable one-package epoxy resin system to start the reaction between the epoxy resin and the hardener, and, before the reaction ratio reaches 50%, leaving the curable one-package epoxy resin system to stand at an ambient temperature.

3 Claims, 3 Drawing Sheets

F I G. 2

F I G. 3
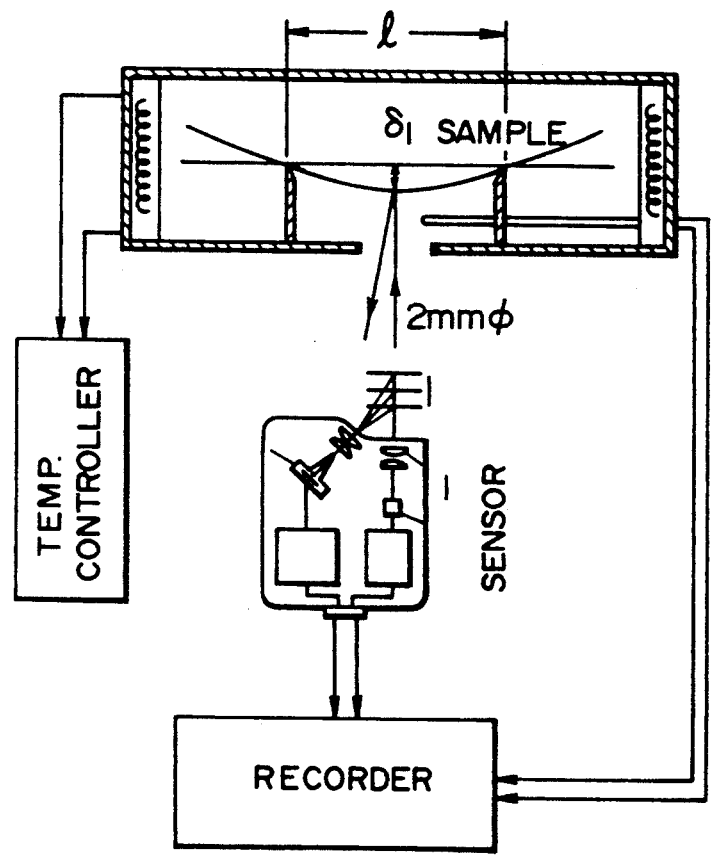

METHOD FOR HARDENING A ONE-PACKAGE EPOXY FORMULATION INCLUDING PARTIAL CURING

This application is a continuation of application Ser. No. 07/479,017 filed Feb. 12, 1990, now abandoned.

BACKGROUND OF THE INVENTION

1. Field of the Invention

The present invention relates to a method for hardening a one-package composition comprising an epoxy resin and a hardener.

In particular, the present invention is useful in the fields of civil engineering and construction, corrosion protection and precision electronic parts, where it is desired to obtain an intended curing characteristic by heat treatment at a relatively low temperature of about 60° to 70° C. for a period of one or two hours or less or for a relatively short period of several minutes at a higher temperature of more than 80° C.

The reasons therefor are that in fields involving a lot of outdoor work such as civil engineering and construction and corrosion protection, etc., it is difficult to find a heat source which permits heat treatment at a high temperature for a long period of time, and in the field of precision electronic parts it is difficult to maintain reliability due to problems of heat resistance, etc., of adherends.

2. Description of Related Art

In the fields of civil engineering and construction, corrosion protection and precision electronic parts, it has been a general practice to use a cold-curing two-package epoxy resin composition for rapid curing at a relatively low temperature.

However, such a two-package epoxy resin composition has the following defects: complicated steps of weighing, mixing, stirring, etc., just before use are required; lack of reliability due to possible errors in weighing; unstable product quality due to very short pot life; difficulty in obtaining its characteristics as designed; large loss of raw material; etc. Due to these defects, a two-package epoxy resin composition has been very disadvantageous where a long working period is required, and adhesives and coating compositions are frequently used, such as, e.g. in the fields of civil engineering and construction, corrosion protection, etc.

Many one-package epoxy resin compositions have been under recent development, and some of them are commercially available. In order to cure one-package epoxy resin compositions, it has been a usual method to heat them at a temperature of not less than 80° C. for several hours.

However, in fields where operations are mainly carried out outdoors, such as in the fields of civil engineering and construction, corrosion protection, etc., heating at a temperature of not less than 80° C. for several hours is very difficult. Further, in the assembling of precision electronic parts where there is a risk of parts being damaged when they are exposed to a high temperature for a long period of time, it has been practically impossible to cure adhesives by heating the parts at a temperature of not less than 80° C. for a long period of time.

SUMMARY OF THE INVENTION

The present invention provides a method for hardening a curable, one-package epoxy resin system, which is applicable not only to outdoor work where heat cannot be applied for a long period of time, but also to the case where an adherend has low heat resistance.

BRIEF DESCRIPTION OF THE DRAWINGS

FIG. 2 is an electron photomicrograph showing a particle structure of the masterbatch-type hardener obtained in Referential Example 5.

FIG. 3 is a schematic view of an internal stress measuring apparatus using an optical strain sensor.

DETAILED DESCRIPTION OF PREFERRED EMBODIMENTS

Figure 1:
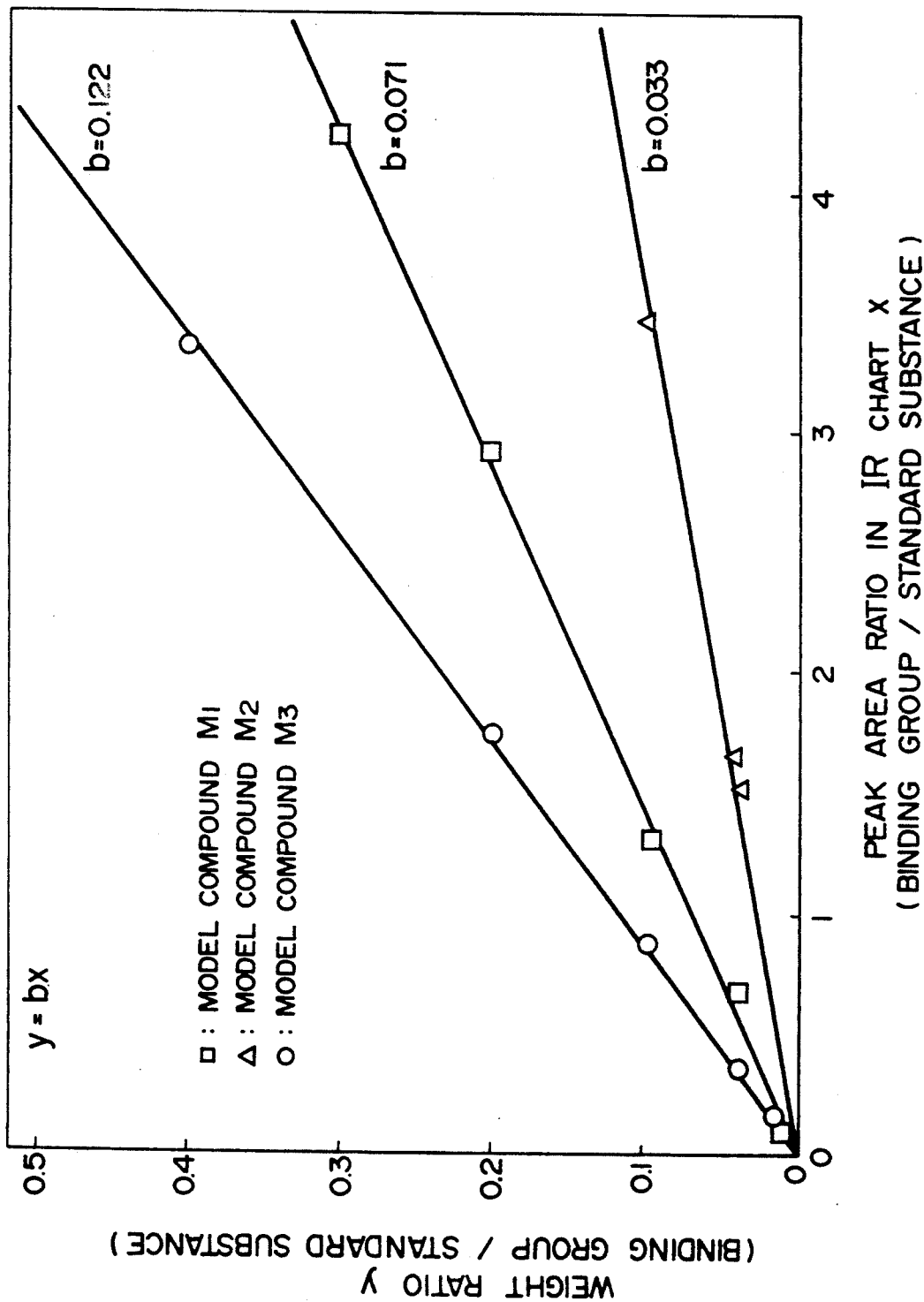
FIG. 1 is a graph showing the relationship between the weight ratio of a model compound to a standard substance and the area ratio in the IR chart in Referential Example 3.

The present invention relates to a method for hardening a curable, one-package epoxy resin system, which comprises heating a one-package composition formed of an epoxy resin and a hardener at a work site to initiate the reaction between the epoxy resin and the hardener, and then, before the reaction ratio reaches 50%, removing the heat and allowing the above composition to stand at an ambient temperature.

The "work site" in the present invention means that portion of a structure, part, etc., in which the epoxy resin is actually cured to provide adherence in civil engineering and construction, corrosion protection and precision electronic parts fields.

The "ambient temperature" in the present invention means the temperature surrounding the work site to which the one-package composition is applied. In general, it therefore means the outside temperature in the fields of civil engineering and construction and corrosion protection, and the working room temperature in the case of precision electronic parts assembly.

The temperature which initiates the reaction between an epoxy resin and a hardener differs to some extent depending upon formulation of the composition. It is, however, typically in the range of from 60° C. to 70° C.

According to the present invention, all that is required to obtain good hardened products is to heat the composition for a relatively short period of time at such a temperature that permits the reaction to start, and then to allow the composition to react at an ambient temperature. Concerning the heating time, it is sufficient to heat the composition until the reaction ratio reaches 50% at the highest. If the reaction initiation temperature is 60° C. to 70° C., a heating time of about one hour or so will be sufficient. If the heating is carried out at a higher temperature, the heating time can be shortened. When a masterbatch-type hardener is used and the composition is heated above 80° C., e.g., at 150° C. to 200° C., a treatment time of dozens of seconds to several minutes is sufficient.

As described previously, it has been a conventional practice to heat a one-package composition at a temperature of not less than 80° C. for several hours to cure the composition, and in order to obtain the desired curing characteristics, a post-curing has been often carried out at a temperature of not less than 100° C. for several hours. It is a rare case to effect the curing at a temperature of only 60° C. to 70° C. In this case, however, heating is effected usually at a temperature of 60° C. to 70° C. for several hours. This fact also illustrates the effect of the present invention.

The "reaction ratio" in the present invention means a value determined by calculation on the basis of an exotherm measured according to differential thermal analysis (DSC method), and the calculation method is as follows.

$$\text{Reaction ratio} = \frac{A - B}{A} \times 100 \ (\%)$$

wherein A denotes a total exotherm (mj/mg) when a one-package composition has been heated up to 275° C. at a constant rate, and B denotes a total exotherm (mj/mg) measured immediately after the reaction of the one-package composition has been started by heating.

The exotherms are obtained from exothermic peak areas when the temperatures of samples have been elevated from room temperature (about 25° C.) up to 300° C. at a rate of 10° C./minute.

In the present invention, the composition being reacted is left to stand at an ambient temperature before the reaction ratio during heating reaches 50%. In general, the reaction ratio differs depending upon the formulation of the curable one-package compositions, the use of a heating temperature higher than the reaction-starting temperature and the heating time.

In the present invention, the heating treatment is stopped preferably before the reaction ratio reaches 50%, and it is more preferable that the heating treatment be stopped and the composition left to stand at an ambient temperature when the reaction ratio reaches 10 to 30%.

When the reaction ratio reaches 50%, the heating is within the usual curing-by-heating conditions, i.e., heating at a temperature of not less than 80° C. for several hours or more, and if such curing-by-heating conditions cause no trouble on use, cured products meeting the purpose desired for use can be obtained. However, the energy consumption for the curing will be considerably large.

The present inventor has found that when a curable, one-package composition is left to stand at an ambient temperature after reaction, or cure, thereof is started, the reaction proceeds effectively to give a good cured product. However, the period of time for reaching a cured product having intended curing characteristics differs depending upon the ambient temperature. In general, the higher the ambient temperature, the shorter the period of time during which the composition must be left to stand.

According to the present invention, it is particularly possible to obtain a cured product in which internal stresses are small. The reason therefor is presumably that since the curing reaction in the present invention proceeds by allowing the composition to stand at an ambient temperature after the curing reaction is started, the degree of shrinkage resulting from the curing process is low and stresses, etc., occurring within the cured product are small. When a one-package composition is used as an adhesive or sealing agent in the electric and electronic material fields, the small internal stress means that the straining energy of electric and electronic parts and elements is small and that the reliability of products can be, therefore, improved.

In the present invention, a good cured product can be obtained merely by allowing the composition to stand under an ordinary environment and thereby to proceed with its curing reaction. Meanwhile, as described previously, there is known a cold-curing, two-package epoxy resin composition, in which the curing reaction proceeds by allowing the composition to react under an ordinary environment. These two compositions are, therefore, apparently similar to each other. However, the method of the present invention differs entirely from the curing method of the above cold-curing, two-package epoxy resin composition in that the present invention uses a step of starting, by heating, the reaction between an epoxy resin and a hardener of a highly stable one-package composition which hardly undergoes reaction under an ordinary environment and then allowing the composition to stand in an ordinary environment. Further, a cured product obtained according to the present invention has higher resistance to heat than that obtained by curing a cold-curing, two-package epoxy resin composition, and has the characteristics of a heat-curing epoxy resin composition.

As a one-package epoxy resin composition operable in the present invention, conventionally known one-package epoxy resin compositions may be used. In particular, masterbatch-type hardeners, which will be discussed below, are preferably used, and other hardeners such as guanidines, hydrazides, acid anhydrides, etc., can also be used in combination.

Further, it is also possible to incorporate into the one-package epoxy resin composition a conventional additive, reinforcing agent, filler, pigment, organic solvent, reactive diluent, nonreactive diluent, modified epoxy, and the like.

The epoxy resin as a component of the one-package composition useful in the present invention has at least two epoxy groups per molecule. Examples, thereof include polyhydric phenols such as bisphenol A, bisphenol F, catechol and resorcin; polyglycidyl ethers formed by reacting a polyhydric alcohol such as glycerin and polyethylene glycol, with epichlorohydrin; glycidyl ether esters formed by reacting a hydroxycarboxylic acid such as p-oxybenzoic acid and β-oxynaphthoic acid, with epichlorohydrin; polyglycidyl esters formed by reacting a polycarboxylic acid such as phthalic acid and terephthalic acid, with epichlorohydrin; glycidylamine compounds formed by reacting 4,4'-diaminodiphenylmethane or an aminophenol, with epichlorohydrin; epoxidized novolak resin; epoxidized cresol novolak resin; epoxidized polyolefin, and the like. However, the epoxy resin is not be limited to these.

A preferred epoxy resin is diglycidyl ether of bisphenol A.

The one-package epoxy resin composition preferably used in the present invention includes masterbatch-type hardeners described in Japanese Patent Application Laid-Open No. 70523/1989. The components of the masterbatch-type hardener are explained in detail below.

The masterbatch-type hardener is formed by mixing a hardener (I) and an epoxy resin (B) in a certain ratio, e.g., 100 parts by weight of the hardener (I) and 10 to 50,000 parts by weight of the epoxy resin (B).

The hardener (I) will be described first. The hardener (I) has a structure composed of a core of a powdery amine compound (A) and a shell of the reaction product of an identical amine compound (A) and the epoxy resin (B).

This powdery amine compound (A) is obtained by treating a powdery amine compound (a) having a tertiary amino group. The powdery amine compound (a) having a tertiary amino group has no primary or secondary amino group, and its examples are as follows:

(1) reaction products (a-1) formed by reacting a compound having at least one primary amino group in the molecule and/or a compound having a secondary amino group, with a carboxylic acid, sulfonic acid, isocyanate or an epoxy compound; provided that reaction products which have a primary amino group or secondary amino group in the molecule are excluded; and (2) imidazole compounds (a-2)

Raw materials for the reaction products (a-1) will be described hereinbelow.

As a compound having at least one primary amino group in the molecule, any of an aliphatic primary amine, an alicyclic primary amine and an aromatic primary amine can be used.

Examples of the aliphatic primary amine include methylamine, ethylamine, propylamine, butylamine, ethylenediamine, propylenediamine, hexamethylenediamine, diethylenetriamine, triethylenetetramine, methanolamine, ethanolamine, propanolamine, and diethylaminopropylamine.

Examples of the alicyclic primary amine include cyclohexylamine, isophoronediamine, and aminoethyl piperazine.

Examples of the aromatic primary amine include aniline, toluidine, diaminodiphenylmethane and diaminodiphenylsulfone.

As a compound having at least one secondary amino group in the molecule, any of an aliphatic secondary amine, an alicyclic secondary amine, an aromatic secondary amine, an imidazole, and an imidazoline can be used.

Examples of the aliphatic secondary amine include dimethylamine, diethylamine, dipropylamine, dibutylamine, dipentylamine, dihexylamine, dimethanolamine, diethanolamine, and dipropanolamine.

Examples of the alicyclic secondary amine include dicyclohexylamine, and N-methylpiperazine.

Examples of the aromatic secondary amine include diphenylamine, phenylmethylamine, and phenylethylamine.

Examples of the imidazole include imidazole, 2-methylimidazole, 2-ethylimidazole, 2-isoproipylimidazole, 2-dodecylimidazole, 2-undecylimidazole, 2-phenylimidazole, 2-heptadecylimidazole, 2-ethyl-4-methylimidazole, and carboxylates of these imidazole compounds.

Examples of the imidazoline include 2-methylimidazoline, 2-phenylimidazoline, 2-undecylimidazoline and 2-heptadecylimidazoline.

Examples of other raw materials for the reaction product (a-1) include:

carboxylic acid compounds: succinic acid, adipic acid, sebacic acid, phthalic acid, dimer acid, etc.;

sulfonic acid compounds; ethanesulfonic acid, p-toluenesulfonic acid, etc.;

isocyanate compounds: tolylene diisocyanate, 4,4'-diphenylmethane diisocyanate, hexamethylene diisocyanate, etc.; and epoxy compounds: any of a monoepoxy compound, diepoxy compound and polyvalent epoxy compound can be used alone or in combination.

Examples of the monoepoxy compound include butylglycidyl ether, hexylglycidyl ether, phenylglycidyl ether, allylglycidyl ether, p-tert-butylphenylglycidyl ether, ethylene oxide, propylene oxide, p-xylylglycidyl ether, glycidyl acetate, glycidyl butyrate, glycidyl hexoate, glycidylbenzoate and epoxy resin.

Examples of the diepoxy compound include dihydric phenol compounds such as bisphenol A, bisphenol F, catechol and resorcin; dihydric alcohols such as ethylene glycol, propylene glycol, polyethylene glycol, polypropylene glycol, 1,4-butanediol and neopentyl glycol; hydroxycarboxylic acids such as p-oxybenzoic acid and β-oxynaphthoic acid; diglycidyl compounds formed by reacting a dicarboxylic acid such as phthalic acid, terephthalic acid and hexahydrophthalic acid, with epichlorohydrin; and alicyclic epoxy compounds such as 3,4-epoxy-6-methylcyclohexylmethyl-3,4-epoxy-6-methylcyclohexane carboxylate and 3,4-epoxycyclohexylmethyl (3,4-epoxycyclohexane) carboxylate.

A preferred amine compound (a-1) is the reaction product between N-methyl-piperazine or diethylaminopropylamine and an epoxy compound, and is obtained by reacting a secondary amine having one equivalent of active hydrogen atoms with an epoxy compound having one epoxy equivalent.

Examples of the imidazole compound (a-2) include 1-cyanoethyl-2-undecyl-imidazole-trimellitate, imidazolyl-succinate, 2-methylimidazole succinate, 2-ethylimidazole succinate, 1-cyanoethyl-2-methylimidazole, 1-cyanoethyl-2-undecylimidazole and 1-cyanoethyl-2phenylimidazole.

A preferred amine compound (a) is a reaction product formed by reacting a primary or secondary amine with a compound having an epoxy group in such amounts that the amount of the epoxy groups of the epoxy compound is 0.8 to 1.2 equivalents per equivalent of active hydrogen atoms of the amine compound.

Among these amine compounds (a), in particular, imidazole derivatives having at least one hydroxyl group in the molecule are preferably used to obtain a composition having easy curability and excellent storage stability. Such imidazole derivatives are, for example, addition compounds of an imidazole compound or a carboxylic acid salt of an imidazole compound with a compound having at least one epoxy group in the molecule. Examples of the imidazole compound include imidazole, 2-methylimidazole, 2-ethylimidazole, 2-ethyl-4-methylimidazole, 2-propylimidazole, 2-undecylimidazole, 2-phenylimidazole, and carboxylates of these.

Amine compounds which have at least two hydroxyl groups in the molecule, and which are formed by reaction between an imidazole and a compound having at least two epoxy groups in the molecule, are preferred because a composition having rapid speed of hardening and excellent storage stability can be obtained.

Examples of the carboxylic acid include acetic acid, lactic acid, salicylic acid, benzoic acid, adipic acid, phthalic acid, citric acid, tartaric acid, maleic acid and trimellitic acid.

Examples of the compound having at least one epoxy group in the molecule include monoepoxy compounds of butylglycidyl ether, hexylglycidyl ether, phenylglycidyl ether, p-xylylglycidyl ether, glycidyl acetate, glycidyl butyrate, glycidyl hexoate, glycidyl benzoate, acrylglycidyl ether, p-tert-butylphenylglycidyl ether, ethylene oxide, propylene oxide, and the like, or epoxy resins.

In order to obtain excellent curability and storage stability, preferably used as the imidazole is one of 2-methylimidazole and 2-ethyl-4-methylimidazole or a mixture of these, and preferably used as the epoxy compound is an epoxy resin formed by reaction between bisphenol A and epichlorohydrin.

The adduct of the above imidazole with the epoxy compound can be formed by reacting 1 to 5 moles of the imidazole with 1 to 5 moles of the epoxy compound according to a conventionally known process.

There is no special limitation on the average particle size of the powdery amine compound (A) having a tertiary amino group. However, when the average particle size is too large, curability is sometimes reduced or mechanical properties of a cured product are sometimes degraded. The average particle size is preferably not over 50μ. An average particle diameter exceeding this limit leads to degradation of chemical resistance and mechanical strength in the cured product. The optimum average particle size is 10μ or less.

Amine compounds having a primary amino group or secondary amino group are excluded from the scope of the powdery amine compounds (A). When a compound having these groups is incorporated into an epoxy resin, and into a liquid epoxy resin in particular, the viscosity of the resultant composition becomes extremely high.

In the powdery amine compound (A) as a component of the previously mentioned masterbatch-type hardener, those having binding groups (x) and (y) which absorb infrared rays of 1,630 to 1,680 cm$^{-1}$ and 1,680 to 1,725 cm$^{-1}$ are preferred. These can be measured by using an infrared spectrophotometer, and more precisely analyzed by using a Fourier transform infrared spectrophotometer.

Among the binding groups (x) capable of absorbing infrared rays of 1,630 to 1,680 cm$^{-1}$, a urea bond is especially useful.

Among the binding groups (y) capable of absorbing infrared rays with 1,680 to 1,725 cm$^{-1}$, a biuret bond especially useful.

These urea bond and biuret bonds are formed by reacting an isocyanate compound with water or an amine compound having at least one primary amino group per molecule.

The isocyanate compound useful for forming a urea bond as a typical example of the binding group (x) and a biuret group as a typical example of the binding group (y) may be a compound having at least one isocyanate group per molecule. It is, however, preferable to use a compound having two isocyanate groups or more per molecule.

Typical examples of the isocyanate compound are an aliphatic diisocyanate, an alicyclic diisocyanate, an aromatic diisocyanate and an aliphatic triisocyanate.

Examples of the aliphatic diisocyanate include ethylene diisocyanate, propylene diisocyanate, butylene diisocyanate and hexamethylene diisocyanate.

Examples of the alicyclic diisocyanate include isophorone diisocyanate and 4,4'-dicyclohexylmethane diisocyanate.

Examples of the aromatic diisocyanate include tolylene diisocyanate, 4,4'-diphenylmethane diisocyanate, xylylene diisocyanate and polymethylenepolyphenyl polyisocyanate.

An example of the aliphatic triisocyanate is 1,3,6-triisocyanatemethylhexane.

Further, it is also possible to use adducts of the above isocyanate compounds with compounds having a hydroxyl group in the molecule, e.g., reaction products of the above isocyanate compounds with α,ω-dihdyroxyalkanes and reaction products of the isocyanate compounds with bisphenols. Pre-reaction products of the isocyanate compounds with water may also be used.

As the amine compound having at least one primary amino group, which is used to form a urea bond or biuret bond as typical examples of the binding groups (x) and (y), useful are an aliphatic amine, an alicyclic amine and an aromatic amine.

Examples of the aliphatic amine include alkylamines such as methylamine, ethylamine, propylamine and butylamine; alkylenediamines such as ethylenediamine, propylenediamine, butylenediamine and hexamethylenediamine; and polyalkylenepolyamines such as diethylenetriamine, triethylenetetramine and tetraethylenepentamine.

Examples of the alicyclic amine include cyclopropylamine, cyclobutylamine, cyclopentylamine, cyclohexylamine and isophoronediamine.

Examples of the aromatic amine include aniline, toluidine, benzylamine, naphthylamine, diaminodiphenylmethane and diaminodiphenylsulfone.

In the powdery amine compound (A), the concentration of each of the binding groups (x) and (y) is preferably in the range of from 1 to 1,000 meq/kg. When the concentration of the binding group (x) is lower than 1 meq/kg, the compound (A) has insufficient mechanical strength, and the pot life of the resultant composition is short.

When this concentration is higher than 1,000 meq/kg, the resultant composition, impractically, has poor curability and requires high-temperature curing. The concentration of the binding group (x) is more preferably in the range of from 10 to 300 meq/kg.

When the concentration of the binding group (y) is lower than 1 meq/kg, the compound (A) has insufficient mechanical strength, and the pot life of the resultant composition is short. When this concentration is higher than 1,000 meq/kg, the resultant composition, impractically, has poor curability and requires high-temperature curing. The concentration of the binding group (y) is more preferably in the range of from 10 to 200 meq/kg.

In addition to the binding groups (x) and (y), the powdery amine compound (A) preferably has a binding group (z) capable of absorbing infrared rays with a wave number of 1,730 to 1,755 cm$^{-1}$.

Particularly useful as the binding group (z) is a carbonyl group of a urethane bond. The urethane bond is formed by reacting an isocyanate compound with a compound having at least one hydroxyl group in the molecule.

As a compound having at least one hydroxyl group in the molecule for forming an urethane bond as a typical example of the binding group (z), useful are alcohols such as aliphatic saturated alcohols, aliphatic unsaturated alcohols, alicyclic alcohols, aromatic alcohols, and the like; and phenol compounds.

Examples of the aliphatic alcohols include monoalcohols such as methyl, ethyl, propyl, butyl, amyl, hexyl, heptyl, octyl, nonyl, decyl, undecyl, lauryl, dodecyl, stearyl and eicosyl alcohols; and ethylene glycol monoalkyl ethers such as ethylene glycol monomethyl ether, ethylene glycol monoethyl ether, ethylene glycol monobutyl ether and ethylene glycol monohexyl ether. Further, dihydric alcohols such as ethylene glycol, polyethylene glycol, propylene glycol, polypropylene glycol, 1,3-butanediol and neopentyl glycol; trihydric alcohols such as glycerin and trimethylol propane; and tetrahdyric alcohols such as pentaerythritol can also be used.

Examples of the aliphatic unsaturated alcohols include allyl alcohol, crotyl alcohol and propargyl alcohol.

Examples of the alicyclic alcohols include cyclopentanol and cyclohexanol.

Examples of the aromatic alcohols include monoalcohols such as benzyl alcohol and cinnamyl alcohol.

These alcohols may be primary, secondary or tertiary. Also useful as the alcohol are compounds having at least one secondary hydroxyl group in the molecule and formed by the reaction between a compound having at least one epoxy group in the molecule and a compound having at least one hydroxyl group, carboxyl group, primary or secondary amino group, or mercapto group.

Examples of the phenol compounds include monohydric phenols such as carbolic acid, cresol, xylenol, carvacrol, thymol and naphthol; dihydric phenols such as catechol, resorcin, hydroquinone, bisphenol A and bisphenol F; and trihydric phenols such as pyrogallol and phloroglucin.

Preferred compounds having at least one hydroxyl group in the molecule are alcohol or phenol compounds having two or more hydroxyl groups.

A preferred concentration of the binding group (z) in the powdery amine compound (A) is in the range of from 1 to 200 meq/kg. When the concentration of the binding group (z) is lower than 1 meq/kg, the pot life of the resultant composition is short. When it is higher than 200 meq/kg, the composition, impractically, has poor curability and requires high-temperature curing. A more preferred concentration is in the range of from 5 to 100 meq/kg.

The ratio of the concentration of the binding group (z) to the total concentration of the binding groups (x) and (y):

$$\frac{\text{binding group } (z)}{\text{binding group } (x) + \text{binding group } (y)}$$

is preferably in the range of from 0.05 to 1.0. When the ratio is less than 0.05, the compound (B) has too high a cohesive force, and a higher curing temperature than practical is required. When it is more than 1.0, the compound (B) has too low a cohesive force, and the resultant composition has poor storage stability and lower resistance to mechanical shear stress.

Concentrations of the binding groups (x) and (y) can be determined as follows: Calibration curves are drawn by using model compounds represented by the following formulae (1) and (2) and a standard substance which has none of binding groups (x) and (y) and has a functional group capable of absorbing infrared rays having a specific wavelength. Then the standard substance and the powdery amine compound (A) are mixed in certain ratios, the intensity of absorption of infrared rays, i.e., those with 1,630 to 1,680 cm$^{-1}$ and 1,680 to 1,725 cm$^{-1}$, of the mixture is measured, and the concentrations calculated on the basis of the calibration curves. 2,3-Dimethyl-2,3-dicyanobutane can be used as a standard substance, and the absorption intensity based on cyano groups of this substance at a wave number of 2,220 to 2,250 cm$^{-1}$ is useful.

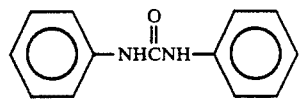

Formula (1)
(Model compound M 1)

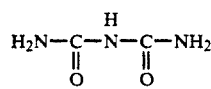

Formula (2)
(Model compound M 2)

The concentration of the binding group (2) can be determined by using a model compound represented by the following formula (3) and 2,3-dimethyl-2,3-dicyanobutane in the same manner as that for the binding groups (x) and (y).

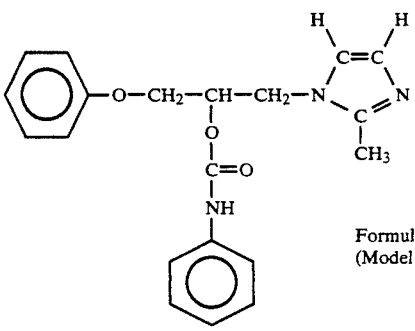

Formula (3)
(Model compound M 3)

There is no particular restriction on the choice of epoxy resins (B) for use in the present invention is so far as they have on the average at least two epoxy groups in the molecule. Examples of such epoxy resins are: polyglycidyl ethers obtained by reacting epichlorohydrin with a polyhydric phenol such as bisphenol A, bisphenol F, catechol, or resorcinol or with a polyhydric alcohol such as glycerol or polyethylene glycol; glycidyl ether esters obtained by reacting epichlorophydrin with a hydroxycarboxylic acid such as p-hydroxybenzoic acid or β-hydroxynaphthoic acid; polyglycidyl esters obtained by reacting epichlorohydrin with a carboxylic acid such as phthalic acid or terephthalic acid; glycidylamine compounds obtained by reacting epichlorophydrin with 4,4'-diaminodiphenylmethane or with m-aminophenol; and epoxidized novolak resins, epoxidized cresol novolak resins, and epoxidized polyolefins, though not limited to these resins. In particular, a diglycidyl ether obtained from bisphenol A is preferred.

The masterbatch-type hardener can be produced, for example, by dispersing a tertiary-amino-group-containing powdery compound (a) in an epoxy resin (B) in advance, and adding an isocyanate compound thereto and reacting the compounds in the presence of water. A shell can be formed on the surface of a core of the particles by this reaction. The concentrations of the binding groups (x), (y) and (z) in the powdery amine compound (A) can be adjusted by changing the amount of water relative to the tertiary-amino-group-containing compound (a), the amount of the isocyanate compound relative to the tertiary-amino-group-containing compound (a) and the kinds of isocyanate.

When the tertiary-amino-group-containing powdery compound (a) is dispersed in the epoxy resin (B) in advance, it is preferable to mix these components under a mechanical shear force by using a three-roll mill or other suitable apparatus.

The epoxy resin (B) is selected from those specified previously as the epoxy resin (B).

The average thickness of the shell covering the core composed of the powdery amine compound (A) is preferably 50 to 10,000 Å. When it is less than 50 Å, the pot life is insufficient, and when it is more than 10,000 Å, the required curing temperature is impractically high. The thickness of the shell can be measured through a transmittion-type electron microscope. A particularly preferable thickness of the shell is from 100 to 1,000 Å on average.

The epoxy resin (B) as an essential component of the masterbatch-type hardener works as a medium for reacting the tertiary-amino-group-containing compound (a) with the isocyanate compound in the presence of water, and further, has a positive role that a portion thereof forms the shell by reacting with the powdery amine compound (A) and improves the storage stability of the hardener.

The mixing ratio of the powdery amine compound (A) and the epoxy resin (B) by weight is in the range of from 1/0.1 to 1/500. When it is more than 1/0.1, the powdery amine compound (A) cannot be dispersed in the epoxy resin (B).

When the mixing ratio is less than 1/500, the resultant hardener exhibits no performance as such. A preferable range is from 1/1 to 1/5.

The masterbatch-type hardener is a liquid or paste at room temperature.

The mixing ratio of the masterbatch-type hardener is preferably 2 to 60 parts by weight based on 100 parts by weight of the epoxy resin used.

EXAMPLES AND COMPARATIVE EXAMPLE

The present invention will be explained by reference to the following Examples, which, however, shall not limit the present invention. In the Examples and Comparative Examples, "part" stands for "part by weight".

REFERENTIAL EXAMPLE 1

Synthesis of powdery amine compound (A):

One mole of bisphenol A-type epoxy resin (AER-330, manufactured by Asahi Chemical Industry Co., Ltd., epoxy equivalent value: 185) and 1.5 moles of 2-methylimidazole were allowed to react in a methanol-toluene mixture at 80° C., and the solvent was distilled off under reduced pressure to obtain a solid compound.

The solid compound was milled to give a powdery amine compound X-1 having an average particle diameter of 5μ.

REFERENTIAL EXAMPLE 2

Synthesis of a compound having binding groups x, y and z:

One mole of diphenylmethane diisocyanate and 0.5 mole of hexamethylenediamine were allowed to react in advance, and the reaction was further carried out by adding 0.75 mole of bisphenol A thereto to give a polymer P.

REFERENTIAL EXAMPLE 3

Preparation of calibration curves:

By using 2,3-dimethyl-2,3-dicyanobutane as a standard substance and model compound (M 1), a calibration

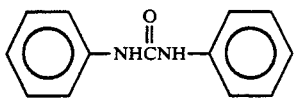

curve was prepared which indicates the relationship between the actual weight ratio and the area ratio of an absorption band of the model compound (M 1) in the range of 1,630 to 1,660 cm$^{-1}$ to an absorption band of the standard substance in the range of 2,220 to 2,250 cm$^{-1}$. FIG. 1 shows the result.

That is, the ordinate axis represents the weight ratio of the model compound (M 1) to the standard substance, and the abscissa axis represents the area ratio of the area of the absorption band (1,630 to 1,600 cm$^{-1}$) of the model compound (M-1) to the area of the absorption band (2,220 to 2,250 cm$^{-1}$) of the standard substance. The values determined have been plotted, whereby it is shown that a linear relationship is present between the weight ratio and the area ratio.

Similarly, a calibration curve was prepared which indicates the relationship between each of the area ratios of the area of an absorption band of model compound (M 2) (1,680 to 1,725 cm$^{-1}$)

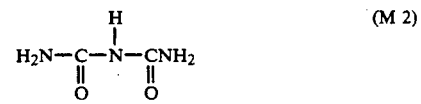

and of an absorption band of model compound (M 3) (1,730 to 1,755 cm$^{-1}$)

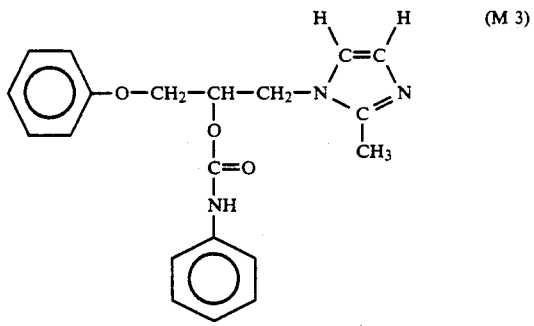

to the area of an absorption band of the standard substance (2,220 to 2,250 cm$^{-1}$) and each of the actual weight ratios. FIG. 1 shows the results.

The method for determining the concentration of each of the binding groups per unit weight of samples on the basis of FIG. 1 is as follows.

A sample exactly weighed for purposes of measurement and the standard substance are mixed, and peak areas in 1,630 to 1,660 cm$^{-1}$, 1,680 to 1,725 cm$^{-1}$ or 1,730 to 1,775 cm$^{-1}$ and in 2,220 to 2,250 cm$^{-1}$ (wave number) are determined from an IR chart. On the basis of these areas, area ratios of the samples are obtained, i.e., a peak area ratio each of the area in 1,630 to 1,660 cm$^{-1}$ to that in 2,220 to 2,250 cm$^{-1}$; of the area in 1,680 to 1,725 cm$^{-1}$ to that in 2,220 to 2,250 cm$^{-1}$ and of the area in 1,730 to 1,755 cm$^{-1}$ to that in 2,220 to 2,250 cm$^{-1}$ is obtained, and on the basis of FIG. 1, a model compound/standard substance weight ratio is obtained by using a line corresponding to the peak.

For example, for 1,630 to 1,660 cm$^-$, a model compound (M 1)/standard substance weight ratio is determined by using a line relating to the model compound (M 1).

An equivalent weight of the binding group of the sample having an absorption capability in 1630 to 1660 cm$^{-1}$ can be given by dividing the weight ratio read from the calibration curve by the ratio of (weight of urea group equivalent/the standard substance weight of the model compound (M 1)). The equivalent weight of the binding group divided by the weight of the sample gives the concentration of the binding group per weight of the sample. As for the other absorptions, the same method can be used.

In addition, an FT-IR (JIR-100) spectrophotometer manufactured by Nippon Densi Co., Ltd. (often referred to as JEOL Ltd.), was used for the measurement of IR spectra.

REFERENTIAL EXAMPLE 4

Synthesis of masterbatch-type hardener:

One gram of the polymer P obtained in Referential Example 2 was dissolved in 99 g of a xylene/methanol (1:1) mixed solvent so as to obtain a one % polymer P solution. To this solution was added 50 g of 1-cyanoethyl-2-phenylimidazole (2PZ-CN) which was pulverized in advance, and the mixture was stirred at 25° C. for 5 minutes, and immediately thereafter, filtered to separate a cake. The cake was heated at 50° C. under a reduced pressure of 5 to 10 mmHg to dissipate the mixed solvent. In this case, the filtrate was measured for nonvolatile content to show 0.3 wt. %. The remainder in an amount of 0.7 wt. % was adhered to the 2PZ-CN.

20 g of AER-331 (bisphenol A type epoxy resin, manufactured by Asahi Chemical Industry Co., Ltd., epoxy equivalent value: 189) was added to 10 g of the above-obtained powdery compound. These components were uniformly mixed in a three-roll mill to give 30 g of a masterbatch-type hardener H-1, which had a viscosity of 220,000 cps (at 25° C.). After one week standing under an atmosphere of 40° C., its viscosity was 250,000 cps. Thus, there was practically no viscosity change.

REFERENTIAL EXAMPLE 5

The powdery amine compound X-1 (200 g) was added to 400 g of AER-331 in a one-liter separable flask having a stirrer and a temperature detector, and further, 5 g of water was added and the components were uniformly mixed. Then, 18 g of tolylene diisocyanate (TDI) was added, and while stirring the mixture at 40° C., the reaction was continued for 2 hours to show that the amount of the remaining TDI was not more than 0.1 g and to give a masterbatch-type hardener H-2. (Analysis of masterbatch-type hardener)

The masterbatch-type hardener H-2 (15 g) was mixed with 100 g of xylene, and the mixture was left to stand for one day to show precipitation of components insoluble in xylene. The mixture was filtered to give 5.6 g of a precipitate. The filtrate was dried under reduced pressure to distill off the xylene, and a viscous liquid remained. The viscous liquid was identified as AER-331 by IR analysis and epoxy equivalent measurement thereof according to a KI-HCl method.

Separately, the precipitate was dried at 40° C. under reduced pressure to obtain an analysis sample. 10 mg of 2,3-dimethyl-2,3-dicyanobutane as a standard substance was added to 3.3 g of the analysis sample, and the mixture was pulverized and mixed in a mortar. Then, 2 mg of the mixture was pulverized together with 50 mg of KBr and formed into tablets having a diameter of 8 mm$\phi$.

IR spectra through these tablets were obtained by using an FT-IR measuring apparatus (model JIR-100, manufactured by Nippon Densi Co., Ltd.). From the spectrum in a 1,500 to 1,800 cm$^{-1}$ IR wavelength region, the concentration of the binding group (x) was determined by using the previously prepared calibration curve to show an amine compound having 55 meq/kg of the binding group.

The concentrations of the binding groups (y) and (z) were also determined from spectra in 1,680 to 1725 cm$^{-1}$ and 1,730 to 1,755 cm$^{-1}$ IR wavelength regions exactly in the same way as above to show 25 meq/kg and 15 meq/kg, respectively.

100 g of AER-331 and 40 g of Epomate B-002 (a hardener manufactured by Yukashell Epoxy Kabushiki Kaisha) were added to 30 g of the present hardener H-2, and the mixture was cured at 25° C. to prepare a specimen for electron microscope observation. The specimen was sliced, and its cross section was photographed by using a transmission-type electron microscope and is shown in FIG. 2. It is seen in FIG. 2 that a shell was formed.

EXAMPLES 1-10

The masterbatch-type hardener H-1 (25 g) was added to 100 g of AER-331 (bisphenol A type epoxy resin, manufactured by Asahi Chemical Industry Co., Ltd.), and they were preliminarily briefly mixed. Then, the mixture was uniformly mixed in a three-roll mill at an output rate of 110 g/minute to prepare a one-package composition F-1.

The resultant composition F-1 had a viscosity of 21,000 cps (at 25° C.).

The above composition was used to prepare bonded samples of a soft steel sheet-soft steel sheet SPCC G (JIS G 3141) coated films for measurement of pencil hardness (film thickness 300 μm), samples for DSC measurement and samples for measurement of internal stress, and these samples were subjected to tests under combined conditions of 2° C., 25° C. or 40° C. as an ambient temperature and 60° C., 70° C. or 200° C. as a heating temperature. Table 1 shows properties of the resultant cured products obtained by subjecting the samples to the above heat treatment to initiate curing and leaving them to stand at the above ambient temperature.

The internal stress was measured in the following method. Metal pieces of phosphor bronze having a thickness of 0.2 mm, width of 13 mm and length of 18 cm, useful for a spring, were coated with the above composition F-1 to a thickness of 0.5 mm, and cured to prepare samples for internal stress measurement. The samples were heated at a temperature elevation rate of 10° C./minute, maintained at 200° C. for 10 minutes to release strain, and then cooled gradually. Strains during this temperature cycle were measured by using an internal stress measuring apparatus with an optical sensor shown in FIG. 3.

The principles of the measurement method and analysis method thereof are as follows.

This measurement method is a so-called bimetal method, in which a residual stress is calculated from a change of the curvature of a metal strip formed by coating its surface with a sample, and an internal stress $\delta$ was calculated by the following equation.

$$\sigma = \frac{w l \delta_1}{3 b h_1 (h_1 + h_2) \delta_2}$$

wherein l=intersupport distance, b=width of a strip with a sample coated thereon, $\delta_1$=internal stress-induced deflection in the central position between the supports, $\delta_2$=deflection in said position when a very small load w is applied, $h_1$=thickness of the coated film, and $h_2$=thickness of the metal sheet. The operative principle of the optical strain sensor shown in FIG. 3 is as follows. That is, light from a light emitting diode (LED) is focused into a narrow beam through a lens and used to irradiate an object, and scattered reflection light is formed, as a spot, into an image on an optical position detection element through a light receptive lens. When the object is displaced, the spot shifts, and this shift amount is nearly in proportion to the displacement of the object. The optical position detection element converts the spot positions to electric signals, and the signals are outputted through a processor circuit in a controller as displacement outputs, which are recorded in a recorder.

COMPARATIVE EXAMPLES 1-6

The same one-package compositions F-1 as those used in Examples 1 to 10 were subjected to heat treatment, and after their reaction ratios exceeded 50%, they were left to stand at ambient temperatures. Table 2 shows the physical properties of the resultant cured products.

TABLE 1

| | Heat treatment conditions | | Characteristics just after heat treatment | | | Standing conditions | | Characteristics after standing | | | |
|---|---|---|---|---|---|---|---|---|---|---|---|
| Example | Temp. (°C.) | Time (min.) | Reaction ratio (%) | Pencil hardness of coated film | Shear bonding strength (kg/cm²) | Ambient temp. (°C.) | Time (days) | Reaction ratio (%) | Pencil hardness of coated film | Shear bonding strength (kg/cm²) | Internal stress (kg/cm²) |
| 1 | 60 | 120 | 15 | 6B> | 22 | 25 | 7 | 71 | 5B | 107 | 60 |
| 2 | 70 | 30 | 12 | 6B> | 16 | 2 | 30 | 60 | 6B | 73 | — |
| 3 | " | " | " | " | " | 25 | 7 | 77 | 5B | 133 | 67 |
| 4 | " | " | " | " | " | 40 | 7 | 83 | 3H | 146 | — |
| 5 | " | " | " | " | 42 | 2 | 30 | 60 | 6B | 77 | — |
| 6 | " | " | " | " | " | 25 | 7 | 80 | 5B | 144 | 70 |
| 7 | " | " | " | " | " | 40 | 7 | 88 | 3H | 152 | — |
| 8 | 200 | 1 | 7 | " | 17 | 2 | 30 | 58 | 6B | 68 | — |
| 9 | " | " | " | " | " | 25 | 7 | 76 | 5B | 137 | 75 |
| 10 | " | " | " | " | " | 40 | 7 | 86 | 3H | 147 | — |

TABLE 2

| | Heat treatment conditions | | Characteristics just after heat treatment | | | Standing conditions | | Characteristics after standing | | | |
|---|---|---|---|---|---|---|---|---|---|---|---|
| Comparative Examples | Temp. (°C.) | Time (min.) | Reaction ratio (%) | Pencil hardness of coated film | Shear bonding strength (kg/cm²) | Ambient temp. (°C.) | Time (days) | Reaction ratio (%) | Pencil hardness of coated film | Shear bonding strength (kg/cm²) | Internal stress (kg/cm²) |
| 1 | 80 | 120 | 80 | 2H | 116 | 2 | 30 | 81 | 2H | 118 | — |
| 2 | " | " | " | " | " | 25 | 7 | 81 | 3H | 114 | 110 |
| 3 | " | " | " | " | " | 40 | 7 | 82 | 3H | 111 | — |
| 4 | 150 | 100 | 73 | 3H | 132 | 2 | 30 | 73 | 3H | 128 | — |
| 5 | " | " | " | " | " | 25 | 7 | 73 | 3H | 125 | 105 |
| 6 | " | " | " | " | " | 40 | 7 | 74 | 3H | 130 | — |

Tables 1 and 2 clearly show that the use of the hardening method of the present invention makes it possible to obtain cured products having excellent curing characteristics even when the compositions are left to stand at ambient temperature after the reaction is started.

EXAMPLES 11-17

The same composition F-1 as that used in Examples 1 to 10 was left to stand at 50° C. for 7 days, and then the procedures of Examples 1 to 10 were repeated to prepare soft steel sheet-soft steel sheet bonded samples, coated films (having a thickness of 300 μm) for measurement of pencil hardness and DSC measurement samples. Table 3 shows the evaluation results.

The F-1 composition had a viscosity of 30,000 cps (at 25° C.) after standing at 50° C. for 7 days.

TABLE 3

| | Heat treatment conditions | | Characteristics just after heat treatment | | | Standing conditions | | Characteristics after standing | |
|---|---|---|---|---|---|---|---|---|---|
| Example | Temp. (°C.) | Time (min.) | Reaction ratio (%) | Pencil hardness of coated film | Shear bonding strength (kg/cm²) | Ambient temp. (°C.) | Time (days) | Pencil hardness of coated film | Shear bonding strength (kg/cm²) |
| 11 | 60 | 120 | 14 | 6B | 23 | 25 | 7 | 5B | 109 |
| 12 | 70 | 30 | 13 | 6B | 16 | 2 | 30 | 6B | 74 |
| 13 | " | " | " | " | " | 25 | 7 | 5B | 136 |
| 14 | " | " | " | " | " | 40 | 7 | 3H | 147 |
| 15 | 200 | 1 | 8 | " | 18 | 2 | 30 | 6B | 70 |
| 16 | " | " | " | " | " | 25 | 7 | 5B | 135 |

TABLE 3-continued

| Example | Heat treatment conditions | | Characteristics just after heat treatment | | | Standing conditions | | Characteristics after standing | |
|---|---|---|---|---|---|---|---|---|---|
| | Temp. (°C.) | Time (min.) | Reaction ratio (%) | Pencil hardness of coated film | Shear bonding strength (kg/cm$^2$) | Ambient temp. (°C.) | Time (days) | Pencil hardness of coated film | Shear bonding strength (kg/cm$^2$) |
| 17 | " | " | " | " | " | 40 | 7 | 3H | 149 |

COMPARATIVE EXAMPLE 7

Five grams of 2-ethyl-4-methylimidazole (2E4MZ) was added to 100 g of the same AER 331 as that used in Examples 1 to 10, and the mixing method in Examples 1 to 10 was repeated to prepare a composition F-2. Further, 5 g of N,N'-benzyldimethylamine (BDMA) was added to 100 g of AER 331, and the mixing method in Examples 1 to 10 was repeated to prepare a composition F-3. When these compositions F-2 and F-3 were left to stand at 50° C., they gelled after one day.

The results of Examples 11 to 17 and Comparative Example 7 show that the one-package composition of the present invention has excellent storage stability and exhibits the effects of the present invention even after storage at 50° C. for 7 days.

EXAMPLE 18 AND COMPARATIVE EXAMPLES 8 AND 9

A cured product was prepared by using the same composition F-1 as that used in Examples 1 to 10, and for comparison, cured products were also prepared by usign two-package epoxy resin compositions. Heat resistance of each of the cured products was evaluated. Comparative Example 8 used the same composition F-2, and in Comparative Example 9, 11.5 g of triethylenetetramine (TETA) was added to AER 331, and the mixing method in Examples 1 to 10 was repeated to prepare a composition F-4. Cured products prepared by curing the above three compositions as shown in Table 4 were cut into test pieces having a length of 30 mm, width of 2 mm and thickness of 2 mm, and heat resistance of each of the test pieces was measured at a temperature elevation rate of 3° C./minute by using a RHEOVIBRON-DDV-III measuring apparatus (manufactured by ORIENTEC Corporation). The temperature at which tan δ peaks were found are referred to as Tg.

TABLE 4

| Example or Comparative Example | Composition | Curing conditions | Tg (°C.) | Elastic modulus in rubber-like region (dyne/cm$^2$) |
|---|---|---|---|---|
| Example 18 | F-1 | Standing at 25° C. for 7 days after heating at 70° C. for 60 minutes | 70 | 1.1 × 10$^9$ |
| Comp. Example 8 | F-2 | Standing at 25° C. for 7 days | 68 | Specimen broke in the vicinity of 100° C. |
| Comp. Example 9 | F-4 | " | 67 | Specimen broke in the vicinity of 100°C. |

Table 4 shows that the cured product according to the present invention is an excellent one having high elastic modulus, whereas those in Comparative Examples are those having low heat resistance.

EXAMPLES 19 AND 20

Dicyandiamide (8 g) was added to 100 g of AER-331 (bisphenol A type epoxy resin, manufactured by Asahi Chemical Industry Co., Ltd.), and they were preliminarily kneaded, and then uniformly mixed at an output rate of 110 g/minute by using a three-roll mill to prepare a one-package composition F-5. By using the composition, soft steel sheet-soft steel sheet SPCC G (JIS G 3141) bonded samples and samples for DSC measurement were prepared, and the samples were each subjected to heat treatment at 150° C. for 45 minutes to start the reaction. Then, the samples were left to stand at an ambient temperature of 25° C. or 40° C. to give cured products. Table 5 shows the properties of the cured products.

TABLE 5

| Example | Heat treatment conditions | | Properties just after heat treatment | | Standing conditions | | Properties after standing | |
|---|---|---|---|---|---|---|---|---|
| | Temp. (°C.) | Time (minutes) | Reaction ratio (%) | Shear bonding strength (kg/cm$^2$) | Ambient temp. (°C.) | Time (day) | Reaction ratio (%) | Shear bonding strength (kg/cm$^2$) |
| 19 | 150 | 45 | 35 | 80 | 25 | 7 | 52 | 101 |
| 20 | 150 | 45 | 35 | 80 | 40 | 7 | 64 | 128 |

In the present invention, the curing of epoxy resin-based one-package compositions can be easily carried out even in outdoor work by simple procedures of heating the compositions to start their reactions and then, after a specified reaction ratio is reached, leaving the compositions to stand at ambient temperatures.

What is claimed is:

1. A method for hardening a curable one-package epoxy resin system comprising the steps of
   providing a curable one-package epoxy resin system comprising a first epoxy resin and a masterbatch hardener, the masterbatch hardener comprising 10–50,000 parts by weight of a second epoxy resin and 100 parts by weight of a hardener comprising a powdery amine having a tertiary amino group and no primary or secondary amino groups and a shell surrounding the powdery amine, the shell comprising a reaction product of the powdery amine and the second epoxy resin, heating the curable one-package epoxy resin system to cause the epoxy and the masterbatch hardener to react, stopping the heating before the reaction ratio reaches 50%, and then allowing the curable one-package epoxy resin system to stand at an ambient temperature thereby to proceed with its curing.

2. The method of claim 1 wherein the system is heated at 60° C. to 70° C. for about one hour.

3. The method of claim 1 wherein heating is stopped after the reaction ratio reached 10 to 30%.

* * * * *